(12) United States Patent
Song

(10) Patent No.: US 12,233,948 B2
(45) Date of Patent: Feb. 25, 2025

(54) VEHICLE BODY JOINT STRUCTURE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 17/964,359

(22) Filed: Oct. 12, 2022

(65) Prior Publication Data

US 2023/0382467 A1   Nov. 30, 2023

(30) Foreign Application Priority Data

May 30, 2022   (KR) .................. 10-2022-0065896

(51) Int. Cl.
*B62D 25/20* (2006.01)
*B62D 21/03* (2006.01)
*B62D 27/02* (2006.01)

(52) U.S. Cl.
CPC ......... *B62D 25/2036* (2013.01); *B62D 21/03* (2013.01); *B62D 27/023* (2013.01)

(58) Field of Classification Search
CPC ........ B62D 21/03; B62D 21/09; B62D 24/00; B62D 25/2036; B62D 25/04; B62D 25/2009; B62D 27/023; B62D 27/065; B62D 31/00; B62D 33/00; B60J 1/16; E05F 15/632
USPC .......... 296/35.3, 35.1, 193.06, 205, 29, 155, 296/193.04
See application file for complete search history.

(56) References Cited

U.S. PATENT DOCUMENTS

| | | | | |
|---|---|---|---|---|
| 5,352,011 A * | 10/1994 | Kihara | .................. | B62D 25/06 296/203.03 |
| 6,824,204 B2 * | 11/2004 | Gabbianelli | ....... | B62D 25/2036 296/193.06 |
| 7,731,274 B2 * | 6/2010 | Kishima | ................ | B62D 27/04 296/203.03 |
| 8,640,814 B2 * | 2/2014 | Deckard | .................. | B60N 2/38 296/205 |
| 2011/0049855 A1 | 3/2011 | Karube et al. | | |
| 2023/0202582 A1 * | 6/2023 | Inagaki | ................ | B62D 27/023 296/193.07 |

FOREIGN PATENT DOCUMENTS

| | | | | |
|---|---|---|---|---|
| EP | 1741619 A1 * | 1/2007 | ................ | B60J 5/06 |
| JP | 5548409 B2 | 7/2014 | | |
| JP | 2020147136 A | 9/2020 | | |
| JP | 6930477 B2 | 9/2021 | | |

\* cited by examiner

*Primary Examiner* — Amy R Weisberg
*Assistant Examiner* — Denise L. Esquivel
(74) *Attorney, Agent, or Firm* — Slater Matsil, LLP

(57) ABSTRACT

An embodiment joint structure of a vehicle body includes a mount bracket attached to a side member of an underbody of the vehicle body and a supporting unit coupled to the mount bracket and to a lower part of a pillar of an upper body of the vehicle body. An embodiment vehicle includes a vehicle body including an underbody and an upper body coupled to the underbody, wherein the upper body includes a plurality of pillars extending in a vertical direction of the vehicle, a floor panel coupled to the plurality of pillars, a mount bracket attached to a side member of the underbody, and a supporting unit coupled to the mount bracket and to a lower part of a pillar of the plurality of pillars.

20 Claims, 9 Drawing Sheets

VEHICLE BODY JOINT STRUCTURE

CROSS-REFERENCE TO RELATED APPLICATIONS

This application claims the benefit of Korean Patent Application No. 10-2022-0065896, filed on May 30, 2022, which application is hereby incorporated herein by reference.

TECHNICAL FIELD

An embodiment of the present invention relates to a vehicle body joint structure.

BACKGROUND

Recently, the vehicle industry has been introducing a new concept of future mobility vision for realizing a human-centered and dynamic future city. One of these future mobility solutions is a purpose built vehicle (PBV) as a purpose-based mobility.

An example of the PBV may be an electric vehicle (EV)-based environment-friendly mobile vehicle. Such a PBV may set an optimal path for each situation by using artificial intelligence and autonomous driving, and may also conduct platoon driving.

The PBV may provide a variety of customized services to passengers during a period in which they travel on the ground to their destination in an autonomous driving manner. For this purpose, the PBV is manufactured with a one box design with a large interior space.

A vehicle body of the PBV includes an underbody (referred to as a rolling chassis or skateboard in the art) and an upper body mounted on the underbody.

For the vehicle body of such a PBV, it is most important to secure mounting rigidity of the underbody and the upper body while reducing the vehicle body weight.

Therefore, the vehicle body of the PBV must have characteristics that can effectively distribute the load input to the vehicle body while securing the joint strength for the mounting parts of the underbody and the upper body.

The above information disclosed in this background section is only for enhancement of understanding of the background of embodiments of the invention, and therefore it may contain information that does not form the prior art that is already known to a person of ordinary skill in the art.

SUMMARY

An embodiment of the present invention relates to a vehicle body joint structure. Particular embodiments relate to a vehicle body joint structure for a PBV.

Embodiments of the present invention provide a vehicle body joint structure capable of easily distributing a load input to the underbody to the upper body while securing the joint strength of the underbody and the upper body.

A vehicle body joint structure according to an embodiment of the present invention as a structure in which an upper body is coupled to an underbody may include at least one mount bracket attached to a side member of the underbody and a supporting unit coupled to a lower portion of at least one pillar so that at least one pillar provided on the upper body is directly connected to at least one mount bracket.

In the vehicle body joint structure according to an embodiment of the present invention, the supporting unit may include a supporting bracket fitted to the lower part of at least one pillar formed by a closed cross-section and joined to the inner surface of the lower part and a pipe nut joined in a vertical direction to the supporting bracket.

In the vehicle body joint structure according to an embodiment of the present invention, the supporting bracket may include a joint flange part extending downward outside the edge of the upper surface of the bracket and joined to the inner surface of the lower part of at least one pillar and a forming part extending downward along the joint flange part inside the edge of the bracket upper surface.

In the vehicle body joint structure according to an embodiment of the present invention, the forming part may include a forming upper surface and a forming lower surface.

In the vehicle body joint structure according to an embodiment of the present invention, the lower end of the pipe nut may be joined to the forming upper surface.

In the vehicle body joint structure according to an embodiment of the present invention, the forming part may support the upper surface of at least one mount bracket through the forming lower surface.

In the vehicle body joint structure according to an embodiment of the present invention, the engage bolt may penetrate at least one mount bracket and the forming part in the vertical direction to be engaged with the pipe nut.

In the vehicle body joint structure according to an embodiment of the present invention, the at least one mount bracket may include an upper plate and a lower plate joined to the side member, a side plate connecting the upper plate and the lower plate, and a spacer coupled to the upper plate and the lower plate between the upper plate and the lower plate.

In the vehicle body joint structure according to an embodiment of the present invention, the engage bolt may penetrate the lower plate, the spacer, and the upper plate in the vertical direction to be engaged with the supporting unit.

In the vehicle body joint structure according to an embodiment of the present invention, the lower part of at least one pillar may be formed of a closed cross-section of a trapezoidal shape.

In the vehicle body joint structure according to an embodiment of the present invention, the supporting bracket may be provided with a shape corresponding to the closed cross-section.

In the vehicle body joint structure according to an embodiment of the present invention, a lower extension member extending from the vertical direction to the vehicle body front-rear direction may be coupled to at least one pillar.

In the vehicle body joint structure according to an embodiment of the present invention, the supporting unit may be coupled to the lower part of the lower extension member.

In the vehicle body joint structure according to an embodiment of the present invention, at least one pillar may be joined to the floor panel through the pillar inner member.

In the vehicle body joint structure according to an embodiment of the present invention, a pair of pillars facing each other among at least one pillar may be connected through a sliding rail reinforcement member.

In the vehicle body joint structure according to an embodiment of the present invention, a tapered part may be formed in the pillar inner member of at least one pillar so that a distance from the pillar outer member gradually increases toward the lower side.

Embodiments of the present invention may eliminate the overlapping coupling cross-section of the underbody and the upper body such as a side seal, and while securing the joint strength of the underbody and the upper body, the load input to the underbody is easily distributed to the upper body.

Therefore, a gap between the crossmember and the part to be assembled can be prevented from being caused, and laser welding quality of the part to be assembled to the crossmember can be further enhanced. Various effects predicted according to the embodiments of the present invention will be disclosed in the detailed description to be described below.

BRIEF DESCRIPTION OF THE DRAWINGS

These drawings are for reference only in describing embodiments of the present invention, and therefore, the technical idea of the present invention should not be limited to the accompanying drawings.

Figure 1:
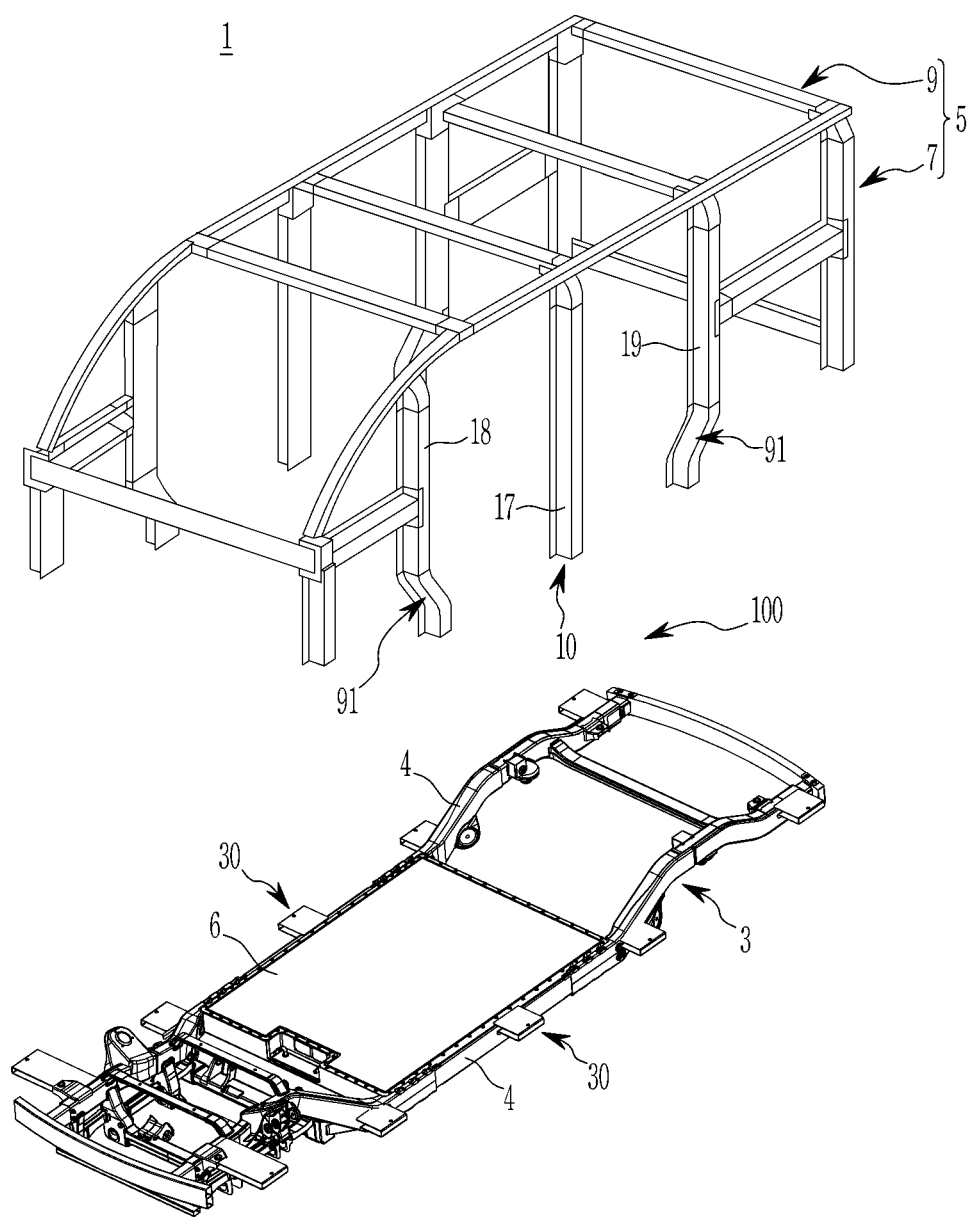
FIG. 1 is a view showing an example of a vehicle body of a PBV to which a vehicle body joint structure according to an embodiment of the present invention is applied.

It should be understood that the referenced drawings are not particularly illustrated according to a scale, and present a brief expression of various preferred features illustrating a basic principle of embodiments of the present invention. For example, specific design features of embodiments of the present invention, which include a specific dimension, a specific direction, a specific position, and a specific shape will be partially determined according to a specific intended application and a specific use environment.

The following reference identifiers may be used in connection with the accompanying drawings to describe exemplary embodiments of the present disclosure.

| | |
|---|---|
| 1: vehicle body | 2: floor panel |
| 3: underbody | 4: side member |
| 5: upper body | 6: battery assembly |
| 7: side structure member | 9: loop structure member |
| 10, 110: pillar | 11, 111: pillar inner member |
| 13, 113: pillar outer member | 15: closed cross-section |
| 17: center pillar | 18: front pillar |
| 19: rear pillar | 30, 130: mount bracket |
| 31: upper plate | 33: lower plate |
| 35: side plate | 37: spacer |
| 39: first penetration hole | 50, 150: supporting unit |
| 51: supporting bracket | 53: joint flange part |
| 55: forming part | 57: bracket upper surface |
| 59: second penetration hole | 61: forming upper surface |
| 63: forming lower surface | 71: pipe nut |
| 80: engage bolt | 91: lower extension member |
| 95: sliding rail reinforcement member | |
| 100: vehicle body joint structure | |
| 114: tapered part | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Terms used herein are used only for a purpose of describing specific embodiments and are not intended to limit the present disclosure. As used herein, singular forms are also intended to include plural forms unless explicitly displayed in terms of a context.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or are indirectly connected through one or more intermediary components, by welding, self-piercing rivets (SPRs), structural adhesives, and the like.

It is understood that the term "vehicle," "vehicular," "car," or other similar term as used herein is inclusive of, in general, passenger automobiles including sports cars, sport utility vehicles (SUVs), buses, trucks, and various commercial vehicles, and is inclusive of hybrid vehicles, electric vehicles, hybrid electric vehicles, hydrogen-powered vehicles, purpose-built vehicles (PBVs), and other alternative fuel vehicles (e.g., fuels derived from resources other than petroleum).

Hereinafter, embodiments of the present disclosure are described in detail with reference to the accompanying drawings.

FIG. 1 is a view showing an example of a vehicle body of a PBV to which a vehicle body joint structure according to an embodiment of the present invention is applied.

Referring to FIG. 1, the vehicle body joint structure 100 according to an embodiment of the present invention may be applied to, for example, a vehicle body 1 of a purpose built vehicle (hereinafter referred to as 'a PBV').

In one example, the PBV may be used as an electric vehicle-based life module vehicle that provides various services to occupants during a time they travel on the ground to their destination in an autonomous driving manner. The above-mentioned life module vehicle is also usually referred to as a robo taxi, a robo shuttle, or a hailing vehicle to a person of ordinary skill in the art.

Such a PBV may be manufactured in a one box design with a large interior space. In addition, the PBV may apply a facing type of seat to provide a spacious interior space.

The vehicle body 1 of the PBV includes a skateboard-type underbody 3 (a person of ordinary skill in the art commonly refers to it as a rolling chassis), and an upper body 5 coupled to the underbody 3.

In this specification, reference directions for describing the following constituent elements as a reference of the vehicle body 1 may be set as a vehicle body front-rear direction (e.g., a vehicle body length direction or longitudinal direction), a vehicle width direction (e.g., a transverse direction), and a vertical direction (e.g., a height direction).

The underbody 3 includes a side member 4 disposed along the vehicle body front-rear direction on both sides along the vehicle width direction.

The side member 4 is provided as a chassis frame on which the battery assembly 6 can be mounted.

And, the upper body 5 is a body-in-white (BIW) body coupled to the underbody 3, and may constitute a cabin. The upper body 5 includes a side structure member 7 coupled to the side member 4 of the underbody 3 and a loop structure member 9 coupled to the upper portion of the side structure member 7.

Here, the side structure member 7 includes at least one pillar 10 connecting the side member 4 and the loop structure member 9 in the vertical direction. The at least one pillar 10 may include a plurality of pillars 10 in one example.

Furthermore, in embodiments of the present invention, a 'top portion', an 'upper portion', or a 'top' or 'upper surface' of the component represents an end portion, a portion, an end, or a surface of the component relatively above in the figure, and a 'bottom portion', a 'lower portion', a 'bottom', or a 'lower surface' of the component represents an end portion, a portion, an end, or a surface relatively below in the figure.

Furthermore, in embodiments of the present invention, the end (e.g., one end or the other end) of the component represents the end of the component in a predetermined direction and the end portion (e.g., one end portion or the other end portion) of the component represents a predetermined portion of the component, which includes the end.

The vehicle body joint structure wo according to an embodiment of the present invention is formed of a structure that may omit an overlapping coupling cross-section (e.g., a side seal) of the underbody 3 and the upper body 5 and secure joint strength of the underbody 3 and the upper body 5.

Figure 2:
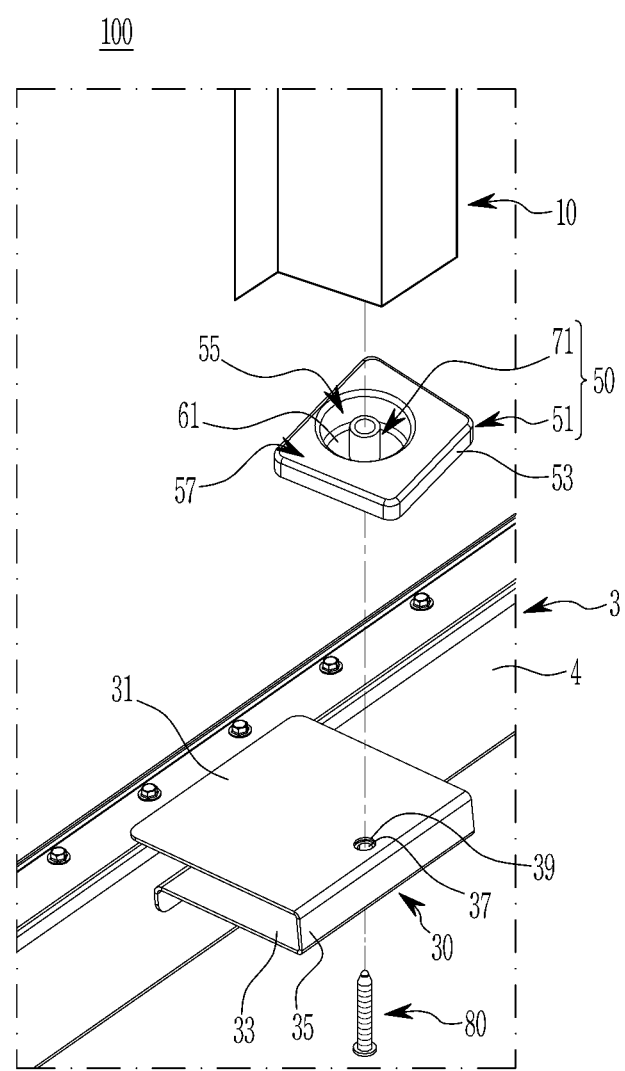
FIG. 2 is a partial exploded perspective view showing a vehicle body joint structure according to an embodiment of the present invention.
Figure 3:
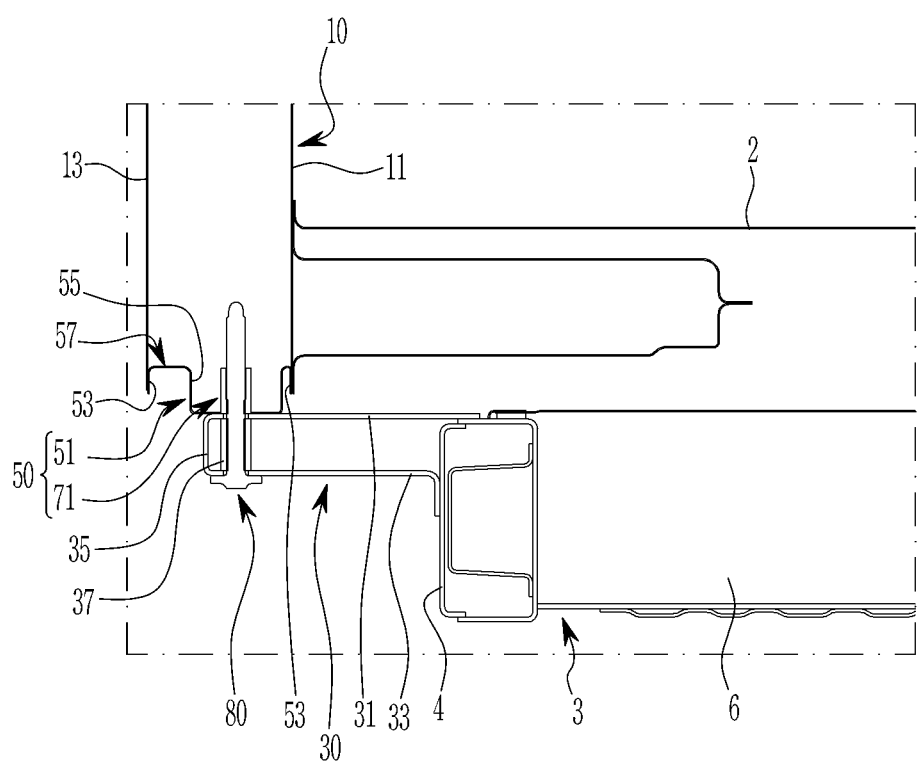
FIG. 3 is a cross-sectional view showing a vehicle body joint structure according to an embodiment of the present invention.

FIG. 2 is a partial exploded perspective view showing a vehicle body joint structure according to an embodiment of the present invention, and FIG. 3 is a cross-sectional view showing a vehicle body joint structure according to an embodiment of the present invention.

Referring to FIG. 1 to FIG. 3, the vehicle body joint structure 100 according to an embodiment of the present invention includes at least one mount bracket 30, a supporting unit 50, and an engagement bolt 80.

In an embodiment of the present invention, the at least one mount bracket 30 may include, in one example, a plurality of mount brackets 30. A plurality of mount brackets 30 are coupled to the side member 4 of the underbody 3 corresponding to each of the plurality of pillars 10. A plurality of mount brackets 30 are joined to the outer surface of the side member 4.

Figure 4A:
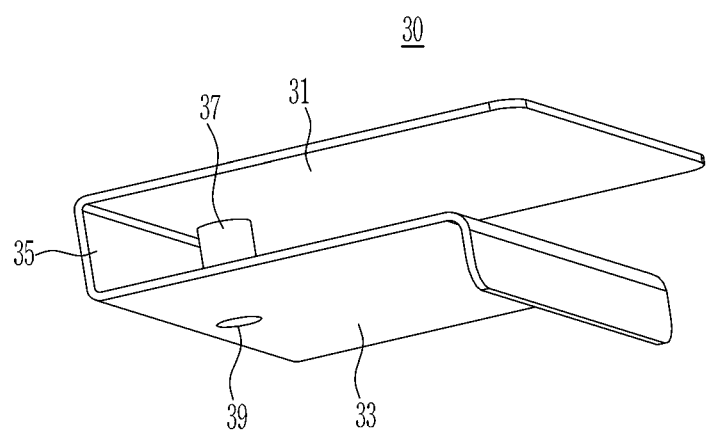
FIG. 4A and FIG. 4B are views showing a mount bracket applied to a vehicle body joint structure according to an embodiment of the present invention.
Figure 4B:
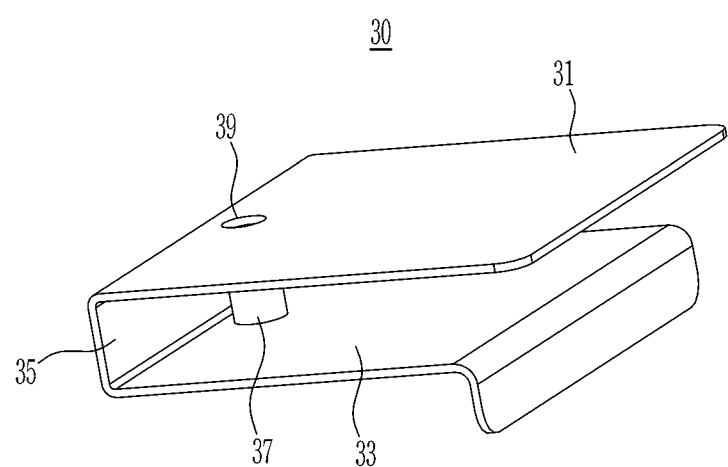

Each of the plurality of mount brackets 30, as shown in FIG. 4A and FIG. 4B, includes an upper plate 31, a lower plate 33, a side plate 35, and a spacer 37.

The upper plate 31 and the lower plate 33 are respectively joined to the outer surface of the side member 4 through one end at a predetermined distance along the vertical direction.

The side plate 35 is connected to the other end of the upper plate 31 and the lower plate 33 along the vertical direction. Then, the spacer 37 is disposed between the upper plate 31 and the lower plate 33, and is coupled to the upper plate 31 and the lower plate 33 along the vertical direction.

Here, the spacer 37 is provided in a cylinder shape and is connected to the first penetration hole 39 formed in the upper plate 31 and the lower plate 33, respectively.

Figure 5:
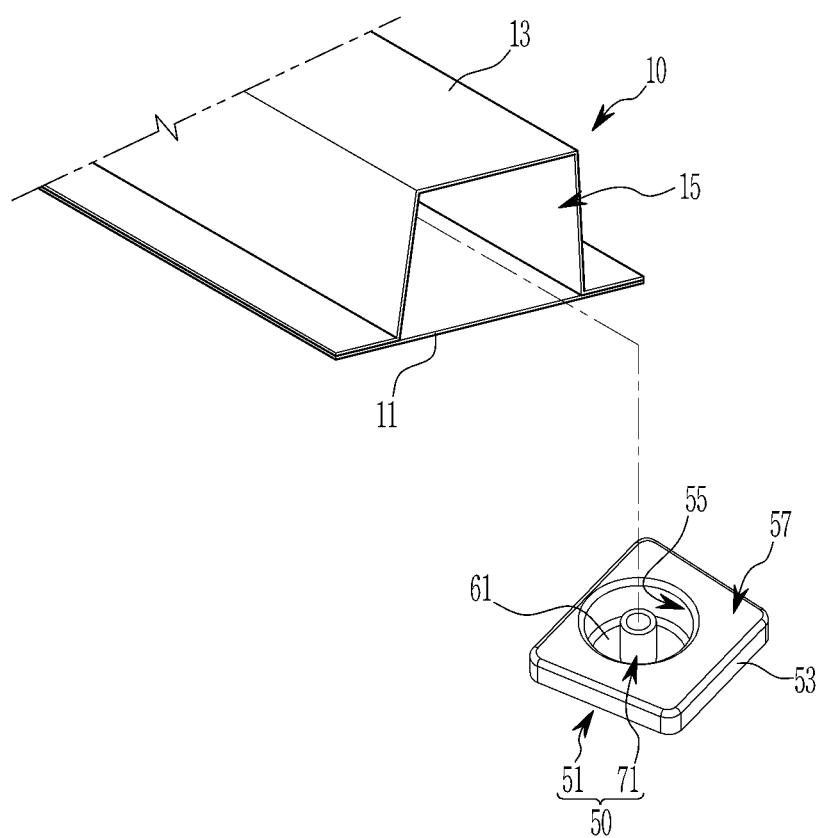
FIG. 5 and FIG. 6 are views showing a supporting unit applied to a vehicle body joint structure according to an embodiment of the present invention.
Figure 6:
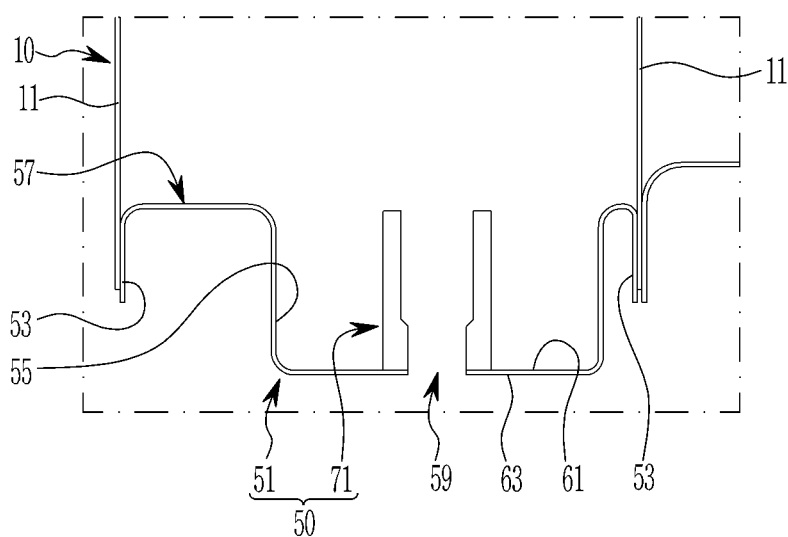

FIG. 5 and FIG. 6 are views showing a supporting unit applied to a vehicle body joint structure according to an embodiment of the present invention.

Referring to FIG. 1 to FIG. 6, in an embodiment of the present invention, the supporting unit 50 supports the lower portion of a pillar of the plurality of pillars 10 and is configured to directly connect the lower portion of the pillar 10 to a mount bracket of the plurality of mount brackets 30. The supporting unit 50 is coupled to the lower portion of the pillar 10.

Here, each of the plurality of pillars 10 includes a pillar inner member 11 and a pillar outer member 13 bonded to each other. The lower portion of each of the plurality of pillars 10 may be formed with a closed cross-section 15 of a trapezoidal shape in one example. In addition, the plurality of pillars 10 may be joined to a floor panel 2 (see FIG. 3) through the pillar inner member 11.

The supporting unit 50 according to an embodiment of the present invention includes a supporting bracket 51 and a pipe nut 71.

The supporting bracket 51 is provided in a shape corresponding to the closed cross-section 15 of the pillar 10. The supporting bracket 51 is inserted into the closed cross-section 15 in the vertical direction and may be bonded (e.g., by welding) to the inner surface of the closed cross-section 15. This supporting bracket 51 includes a joint flange part 53 and a forming part 55.

The joint flange part 53 extends downward (e.g., bends) from the edge outside of the upper surface 57 of the bracket, and is spot welded to the entire inner surface of the closed cross-section 15.

The forming part 55 is formed in the form of a circular groove inside the edge of the upper surface 57 of the bracket. The forming part 55 extends downward along the joint flange part 53 inside the edge of the upper surface 57 of the bracket.

The forming part 55 includes a second penetration hole 59 formed in the inner bottom of the groove. In addition, the forming part 55 includes a forming upper surface 61 and a forming lower surface 63 forming the inner bottom of the groove. Here, the forming part 55 may support the upper surface of the mount bracket 30 through the forming lower surface 63.

The pipe nut 71 is adapted to engage the supporting bracket 51 coupled to the lower portion of the pillar 10 and the mount bracket 30. The pipe nut 71 is attached to the supporting bracket 51 in the vertical direction.

The pipe nut 71 is joined to the forming upper surface 61 of the forming part 55 through the lower end and is connected to the second penetration hole 59 of the forming part 55.

Referring to FIG. 1 to FIG. 6, in an embodiment of the present invention, the engagement bolt 80 is adapted to engage the supporting bracket 51 coupled to the lower portion of the pillar 10 and the mount bracket 30 through the pipe nut 71.

The engagement bolt 80 penetrates the first penetration hole 39 of the mount bracket 30 and the second penetration hole 59 of the forming part 55 in the vertical direction to be engaged with the pipe nut 71.

Further, the engagement bolt 80 may penetrate the first penetration hole 39 of the lower plate 33 of the mount bracket 30, the spacer 37, the first penetration hole 39 of the upper plate 31, and the second penetration hole 59 of the forming part 55 in the vertical direction to be engaged with the pipe nut 71.

Hereinafter, the assembly process and operation of the vehicle body joint structure 100 configured as described above is described in detail with reference to FIG. 1 to FIG. 6.

First, an underbody 3 in which a plurality of mount brackets 30 are coupled to a side member 4 is provided.

In addition, an upper body 5 in which a side structure member 7 and a loop structure member 9 are combined is provided. Here, the side structure member 7 includes a plurality of pillars 10 in which the pillar inner member 11 and the pillar outer member 13 are bonded to each other. The lower portion of each of the plurality of pillars 10 is formed as a closed cross-section 15 having a trapezoidal shape, and the pillar inner member 11 of each of the plurality of pillars 10 is connected to the floor panel 2.

Also, a supporting unit 50 in which the pipe nut 71 is joined in the vertical direction to the forming part 55 of the supporting bracket 51 is provided. Here, the lower end of the pipe nut 71 is joined to the forming upper surface 61 of the forming part 55.

In this state, the supporting bracket 51 is fitted into the closed cross-section 15 of the pillar 10. Then, the joint flange part 53 of the supporting bracket 51 is spot-welded to the entire inner surface of the closed cross-section 15.

Next, the forming lower surface 63 of the forming part 55 is seated on the upper surface of the mount bracket 30. At this time, the first penetration hole 39 of the upper plate 31 and the lower plate 33 of the mount bracket 30, the spacer 37, and the second penetration hole 59 of the forming part 55 are connected in the vertical direction.

Then, the engagement bolt 80 is inserted into the first penetration hole 39, the spacer 37, and the second penetration hole 59, and is engaged with the pipe nut 71. Accordingly, the lower portion of the pillar 10 may be coupled to the mount bracket 30 via the supporting unit 50 and the engagement bolt 80.

Accordingly, the vehicle body joint structure 100 according to an embodiment of the present invention assembled as described above may omit the cross-section of the overlapping coupling of the underbody 3 and the upper body 5, such as a side seal known to a person of ordinary skill in the art.

In addition, the vehicle body joint structure 100 according to an embodiment of the present invention may easily distribute the load input to the underbody 3 to the upper body 5 while securing the joint strength of the underbody 3 and the upper body 5.

Since the vehicle body joint structure 100 according to an embodiment of the present invention as described so far may omit the side seal commonly provided on the upper body 5, it is possible to reduce the weight of the vehicle body 1 and reduce the manufacturing cost.

In addition, in the vehicle body joint structure 100 according to an embodiment of the present invention, as the joint flange part 53 of the supporting bracket 51 is welded to the entire inner surface of the closed cross-section 15, the load input to the plurality of pillars 10 through the underbody 3 during the driving of the PBV may be distributed.

Also, as the vehicle body joint structure 100 according to an embodiment of the present invention supports the forming lower surface 63 of the forming part 55 through the upper surface of the mount bracket 30, during the engaging of the engagement bolt 80, the load concentrated on the pipe nut 71 may be distributed to the plurality of mount brackets 30 through the forming lower surfaces 63.

Further, the vehicle body joint structure 100 according to an embodiment of the present invention may secure the axial force of the engagement bolt 80 through the spacer 37 by mounting the spacer 37 on the mount bracket 30.

Furthermore, in the vehicle body joint structure 100 according to an embodiment of the present invention, as the pillar inner member 11 of each of the plurality of pillars 10 is joined to the floor panel 2, it is possible to improve the water tightness of the lower part of the vehicle body 1 and secure connectivity between the plurality of pillars 10 and front-rear support strength.

On the other hand, referring to FIG. 1, at least one of the plurality of pillars 10 according to an embodiment of the present invention may include a lower extension member 91 extending from the vertical direction to the vehicle body front-rear direction.

In one example, the lower extension member 91 may be provided on a front pillar 18 and a rear pillar 19 respectively disposed on both sides in the front-rear direction of the vehicle body with a center pillar 17 interposed therebetween among the plurality of pillars 10.

Here, the lower extension member 91 may be provided as a lower portion of the front pillar 18 and the rear pillar 19. The lower extension member 91 may be applied when the positions of the plurality of mount brackets 30 corresponding to the plurality of pillars 10 are different. The lower part of the lower extension member 91 may be coupled to the above-mentioned supporting units 50 (referring to FIG. 2).

Figure 7:
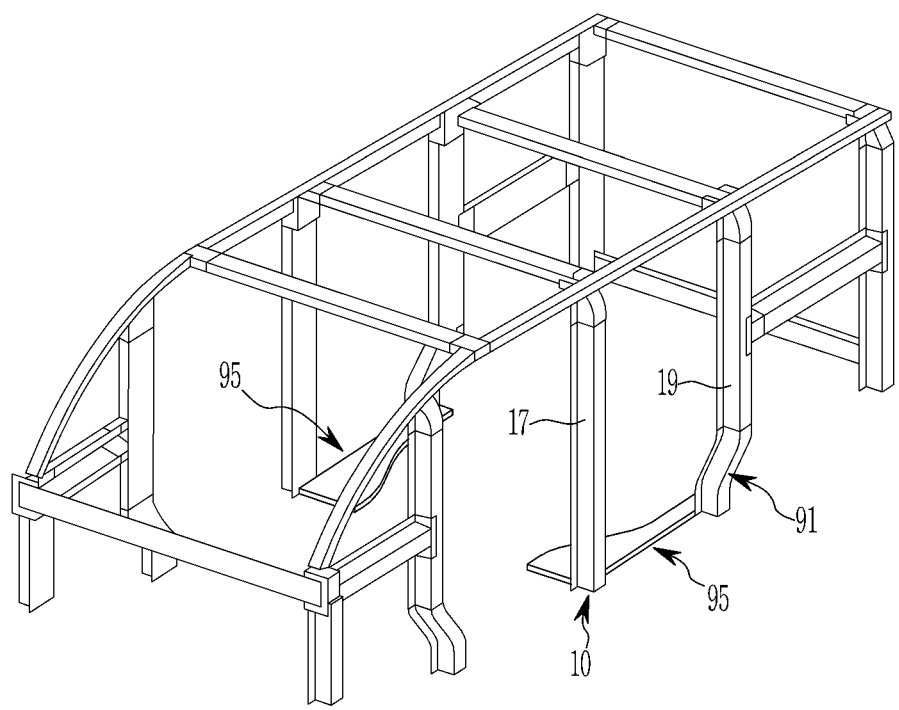
FIG. 7 is a view showing a first variation of a pillar applied to a vehicle body joint structure according to an embodiment of the present invention.

FIG. 7 is a view showing a first variation of a pillar applied to a vehicle body joint structure according to an embodiment of the present invention.

Referring to FIG. 7, a pair of pillars facing each other among the plurality of pillars 10, for example, the center pillar 17 and the rear pillar 19, may be connected in the vehicle body front-rear direction through a sliding rail reinforcement member 95.

The sliding rail reinforcement member 95 is adapted to support a roller (not shown) of a sliding door (not shown) applied to the PBV. In one example, the sliding rail reinforcement member 95 may be connected to the lower extension member 91 coupled to the rear pillar 19 and the lower portion of the center pillar 17 along the vehicle body front-rear direction.

By reinforcing the strength of the center pillar 17 and the rear pillar 19, the sliding rail reinforcement member 95 may minimize buckling deformation of the center pillar 17 and the rear pillar 19 during a side collision of the PBV.

Figure 8:
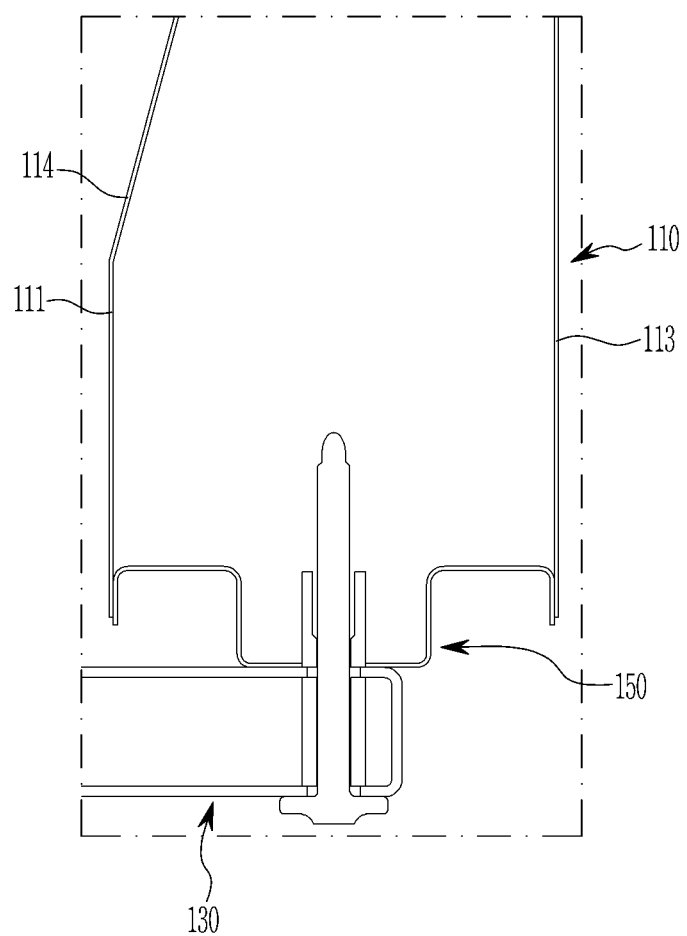
FIG. 8 is a view showing a second variation of a pillar applied to a vehicle body joint structure according to an embodiment of the present invention.

FIG. 8 is a view showing a second variation of a pillar applied to a vehicle body joint structure according to an embodiment of the present invention.

Referring to FIG. 8, at least one pillar among a plurality of pillars no according to an embodiment of the present invention may include a tapered part 114.

The tapered part 114 may be formed on a pillar inner member in under at least one among the plurality of pillars 110. The tapered part 114 is formed to be inclined on the pillar inner member 111 so that the distance from a pillar outer member 113 gradually increases as it goes downward. In addition, a supporting unit 150 is coupled to the lower portion of at least one of the plurality of pillars no provided with the tapered part 114.

Accordingly, as the cross-section of at least one of the plurality of pillars no is expanded by the tapered part 114, the joint strength of at least one of the plurality of pillars 110 may be further improved. In addition, an entry space for a welding machine for welding at least one of the plurality of pillars no and the supporting unit 150 may be secured by the tapered part 114.

Furthermore, as the supporting area of the supporting unit 150 and a mount bracket 130 is increased by the tapered part 114, the load dissipation ability of the supporting unit 150 and the mount bracket 130 may be improved.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A joint structure of a vehicle body, the joint structure comprising:
    a mount bracket attached to a side member of an underbody of the vehicle body; and
    a supporting unit coupled to the mount bracket and to a lower part of a pillar of an upper body of the vehicle body;
    wherein the mount bracket comprises an upper plate and a lower plate coupled to the side member, a side plate connecting the upper plate and the lower plate, and a spacer coupled to the upper plate and the lower plate between the upper plate and the lower plate.

2. The joint structure of claim 1, wherein the supporting unit comprises:
    a supporting bracket coupled to an inner surface of the lower part of the pillar and fitted to the lower part of the pillar, the pillar having a closed cross-section; and
    a pipe nut coupled to the supporting bracket in a vertical direction.

3. The joint structure of claim 2, wherein the supporting bracket comprises:
    a joint flange part extending downward outside an edge of an upper surface of the supporting bracket and coupled to the inner surface of the lower part of the pillar; and
    a forming part extending downward along the joint flange part inside the edge of the upper surface of the supporting bracket.

4. The joint structure of claim 3, wherein:
    the forming part comprises a forming upper surface and a forming lower surface; and
    a lower end of the pipe nut is coupled to the forming upper surface.

5. The joint structure of claim 4, wherein the forming part supports an upper surface of the mount bracket through the forming lower surface.

6. The joint structure of claim 3, wherein an engage bolt penetrates the mount bracket and the forming part in the vertical direction to engage with the pipe nut.

7. The joint structure of claim 2, wherein:
    the lower part of the pillar has a closed cross-section of a trapezoidal shape; and
    the supporting bracket has a shape corresponding to the closed cross-section.

8. The joint structure of claim 1, wherein an engage bolt penetrates the lower plate, the spacer, and the upper plate in a vertical direction to engage with the supporting unit.

9. A joint structure of a vehicle body, the joint structure comprising:
    a mount bracket attached to a side member of an underbody of the vehicle body; and
    a supporting unit coupled to the mount bracket and to a lower part of a pillar of an upper body of the vehicle body; and
    a lower extension member extending from a vertical direction to a vehicle body front-rear direction, the lower extension member being coupled to the pillar.

10. The joint structure of claim 9, wherein the supporting unit is coupled to a lower part of the lower extension member.

11. The joint structure of claim 1, wherein the pillar is coupled to a floor panel through a pillar inner member.

12. The joint structure of claim 1, further comprising a plurality of pillars, wherein a pair of the plurality of pillars facing each other are connected through a sliding rail reinforcement member.

13. The joint structure of claim 1, wherein a pillar inner member comprises a tapered part, and a distance from a pillar outer member gradually increases toward a lower side of the pillar.

14. A vehicle comprising:
    a vehicle body comprising an underbody and an upper body coupled to the underbody, wherein the upper body comprises a plurality of pillars extending in a vertical direction of the vehicle;
    a floor panel coupled to the plurality of pillars;
    a mount bracket attached to a side member of the underbody; and
    a supporting unit coupled to the mount bracket and to a lower part of a pillar of the plurality of pillars;
    wherein the mount bracket comprises an upper plate and a lower plate coupled to the side member, a side plate connecting the upper plate and the lower plate, and a spacer coupled to the upper plate and the lower plate between the upper plate and the lower plate.

15. The vehicle of claim 14, wherein the supporting unit comprises:
    a supporting bracket coupled to an inner surface of the lower part of the pillar and fitted to the lower part of the pillar, the pillar having a closed cross-section; and
    a pipe nut coupled to the supporting bracket in a vertical direction.

16. The vehicle of claim 15, wherein the supporting bracket comprises:
    a joint flange part extending downward outside an edge of an upper surface of the supporting bracket and coupled to the inner surface of the lower part of the pillar; and
    a forming part extending downward along the joint flange part inside the edge of the upper surface of the supporting bracket.

17. The vehicle of claim 16, wherein an engage bolt penetrates the mount bracket and the forming part in the vertical direction to engage with the pipe nut.

18. The vehicle of claim 14, wherein an engage bolt penetrates the lower plate, the spacer, and the upper plate in the vertical direction to engage with the supporting unit.

19. The vehicle of claim 14, further comprising a sliding rail reinforcement member, wherein a facing pair of the plurality of pillars are connected through the sliding rail reinforcement member.

20. The joint structure of claim 9, wherein the supporting unit comprises:
    a supporting bracket coupled to an inner surface of the lower part of the pillar and fitted to the lower part of the pillar, the pillar having a closed cross-section; and a pipe nut coupled to the supporting bracket in a vertical direction.

\* \* \* \* \*